Feb. 25, 1969  A. B. BASSOFF  3,429,195
LEAD MECHANISM
Filed Aug. 15, 1967
FIG.1
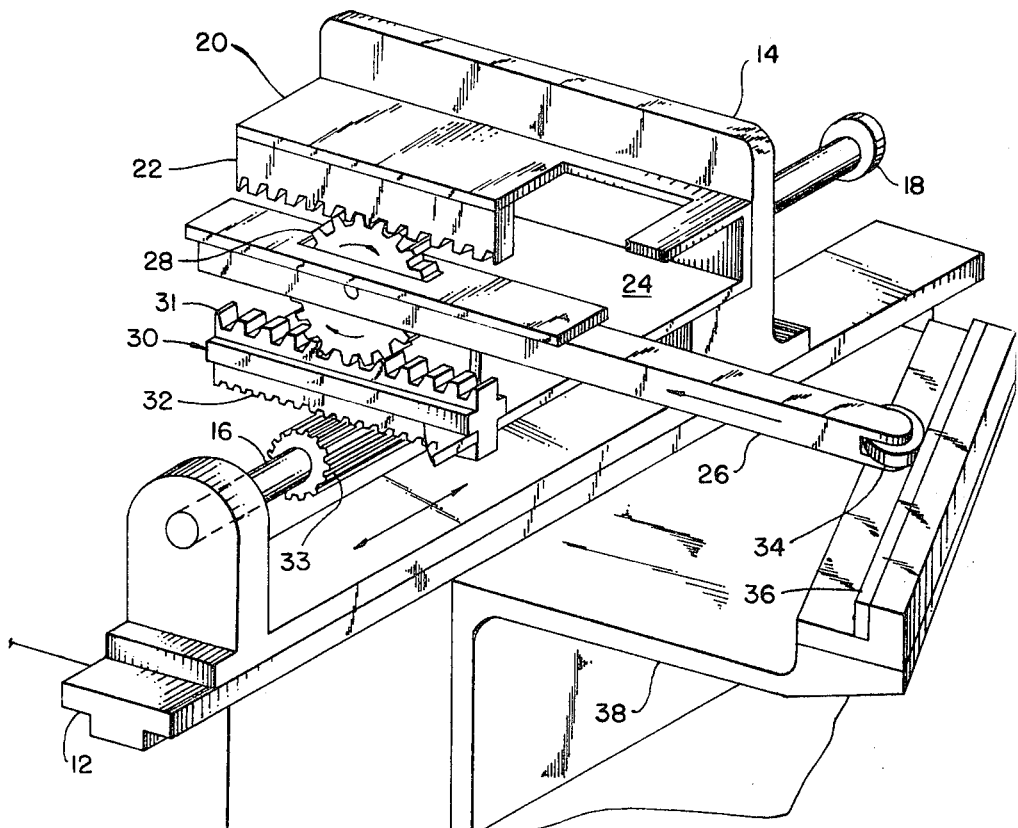
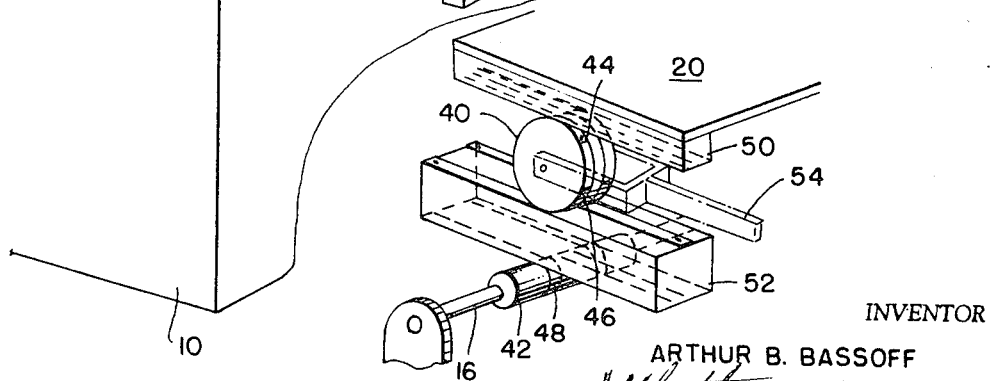
FIG.2
INVENTOR
ARTHUR B. BASSOFF
BY
ATTORNEYS United States Patent Office 3,429,195
Patented Feb. 25, 1969

3,429,195
LEAD MECHANISM
Arthur B. Bassoff, Oak Park, Mich., assignor, by mesne assignments, to Lear Siegler, Inc., Santa Monica, Calif., a corporation of Delaware
Filed Aug. 15, 1967, Ser. No. 660,686
U.S. Cl. 74—422          10 Claims
Int. Cl. F16h *1/04*

ABSTRACT OF THE DISCLOSURE

Lead generating mechanism comprising a rotary shaft, a sine bar inclined to the shaft, a slide actuated by the sine bar movable transversely of the shaft, a stationary rack, a gear on the slide, and a long stroke rack movable parallel to the slide and having means connecting it to the shaft for rotating the shaft.

*Background of the invention*

In lead generating mechanism such as employed in grinders for helical gears, it is usual to have an adjustable inclined sine bar, a slide movable perpendicular to the axis of a rotary work support, a follower on the slide engageable with the sine bar, and mechanism such as tapes connecting the slide to the shaft for effecting a rotation of the shaft timed in accordance with axial reciprocation so as to generate a true lead or helix. Mechanism of this type is subject to the objection that for high helices the inclination of the sine bar becomes so great as to prevent free working of the mechanism.

*Summary of the invention*

In accordance with the present invention, means is provided for multiplying the movement of the sine bar actuated slide.

It is an object of the present invention to provide sine bar mechanism including parallel slides, a gear on one of the slides, a stationary rack engaging the gear, and a rack on the other of the slides so as to provide for double the movement of the second slide.

It is a further object of the present invention to provide motion multiplying mechanism comprising a stationary member, a first slide movable transversely of the stationary member, a rotary member carried by the transverse slide, means connecting the rotary member to the transverse slide for effecting rotation thereof in accordance with transverse movement of the slide, a second slide movable parallel to the first slide, and means connecting the rotary member to the second slide to provide for movement of the second slide dependent on rotation of the rotary member and dependent also on translation of the first slide.

Other objects and features of the invention will become apparent as the description proceeds, especially when taken in conjunction with the accompanying drawing, illustrating preferred embodiments of the invention.

*Brief description of the drawing*

FIGURE 1 is a perspective view with parts broken away of lead mechanism.

FIGURE 2 is a fragmentary perspective view showing the substitution of tapes for the rack and pinion connections shown in FIGURE 1.

*Description of the preferred embodiment*

Referring to the drawing there is illustrated a stationary base 10 which may be the base of a gear grinding machine and which is provided with ways guiding a work table 12 for longitudinal reciprocation in the direction of the arrow. The work table includes a spindle stand 14 in which is journaled a work spindle 16, the spindle 16 including means at 18 for mounting a helical work gear thereon.

Fixedly carried by the spindle stand 14 is a bracket 20 fixedly mounting a rack 22. The spindle stand 14 includes a horizontal plate support 24 and slidable on this plate support in suitable guide means (not shown) is a sine bar follower 26 on which a gear 28 is rotatably mounted and located in position to mesh with the teeth of the rack 22.

Also slidable longitudinally on the plate 24 is a long stroke rack carrier 30 having teeth 31 at the upper side thereof adapted to engage the teeth of the gear 28. The rack carrier 30 is provided with teeth 32 at its underside which mesh with an elongated gear 33 fixed to the work spindle 16. Suitable means (not shown) are provided for guiding the slide 30 in a path parallel to the direction of travel of the follower 26, the direction of reciprocation of these members being perpendicular to the axis of the spindle 16.

Carried by the follower 26 is a roller 34 engageable with a sine bar 36 carried by a bracket 38. Normally, the sine bar is angularly adjustable to provide for variation of different leads or helices, although such adjustment is not illustrated in the drawing.

As the table 12 is reciprocated in the direction of the arrow it will be observed that the follower 26 is moved in a direction perpendicular to the axis of the spindle in timed relation to the movement of the table 12 and at a rate which is dependent upon the inclination of the sine bar 36. As the follower 26 moves to the left, as seen in FIGURE 1, rotation is imparted to the gear 28 in the direction of the arrows thereon by its meshed engagement with the teeth of the rack 22. Due to the meshed engagement of the gear 28 with the rack teeth 31 the long stroke rack carrier 30 will have a movement twice as great as the movement of the follower 26. Movement of the long stroke rack carrier 30 is converted to rotary motion of the spindle 16 by virtue of the meshed engagement of the teeth 32 and the teeth of the gear 33. Since the movement of the long stroke rack carrier 30 is double the movement of the follower 26 it is possible to generate short lead or high angle helices with a moderate inclination of the sine bar 36.

In FIGURE 2 there is shown a modification of the invention described in the foregoing, in which rolls 40 and 42 are substituted for gears 28 and 33, and tape means indicated generally at 44, 46 and 48 connect the rolls to bar 50 and elongated carrier 52. Roll 40 is carried by sine bar follower 54 corresponding to follower 26 of FIGURE 1.

It will be understood that the tape connection may be substituted for only one or two of the rack and gear connections. Where a tape is employed, it is at least partially wound around a cylindrical part, and the arrangement is referred to herein as tape and roller means.

The drawing and the foregoing specification constitute a description of the improved lead mechanism in such full, clear, concise and exact terms as to enable any person skilled in the art to practice the invention, the scope of which is indicated by the appended claims.

What I claim as my invention is:

1. A lead generator comprising a rotary spindle, an inclined sine bar adjacent said spindle, said spindle and sine bar being relatively movable in a direction parallel to the axis of said spindle, a first slide movable perpendicular to the axis of said spindle and having a follower engaged with said sine bar, a rotary member carried by said slide, a fixed member extending parallel to the direction of movement of said first slide, means acting between said fixed and rotary members effective to rotate said rotary member in accordance with movement of said slide, a second slide movable parallel to said first slide, means acting between said rotary member and said second slide effective to traverse said second slide in response both to traverse and rotation of said rotary member, and means acting between said second slide and said spindle to rotate said spindle in response to traverse of said second slide.

2. Apparatus as defined in claim 1 in which said fixed member is a rack and the means acting between said fixed and rotary members are teeth on said rack and rotary member.

3. Apparatus as defined in claim 2 in which said second slide carries a second rack, and in which the means acting between said second slide and said spindle are teeth on said second rack and said spindle.

4. Apparatus as defined in claim 1 in which said second slide carries a rack, and the means acting between said rotary member and said second slide are teeth on the rack on said second slide and on said rotary member.

5. Apparatus as defined in claim 4 in which said second slide carries a second rack, and in which the means acting between said second slide and said spindle are teeth on said second rack and said spindle.

6. Apparatus as defined in claim 1 in which said fixed member is a rack and the means acting between said fixed, and rotary members are teeth on said rack and rotary member, and in which said second slide carries a rack and the means acting between said rotary member and said second slide are teeth on the rack on said second slide and on said rotary member.

7. Apparatus as defined in claim 6 in which said second slide carries a second rack, and in which the means acting between said second slide and said spindle are teeth on said second rack and said spindle.

8. Apparatus as defined in claim 1 in which said second slide carries a second rack, and in which the means acting between said second slide and said spindle are teeth on said second rack and said spindle.

9. Apparatus as defined in claim 1 in which one or more of the means acting between said rotary member and said fixed member, the means acting between said rotary member and said second slide, and the means acting between said second slide and said spindle is a flexible tape means.

10. Apparatus as defined in claim 1 in which each of the means acting between said rotary member and said fixed member, the means acting between said rotary member and said second slide, and the means acting between said second slide and said spindle is either rack and gear means, or tape and roller means.

References Cited
UNITED STATES PATENTS 2,595,460   5/1952   Jabour _____ 51—95
2,913,919   11/1959   Malkiewicz _____ 74—422 X DONLEY J. STOCKING, *Primary Examiner.*

LEONARD H. GERIN, *Assistant Examiner.*

U.S. Cl. X.R.

51—95; 74—29, 203